(No Model.)
F. LITTERER & L. McKINNISS.
CHECK ROWER FOR CORN PLANTERS.
No. 278,441. Patented May 29, 1883.
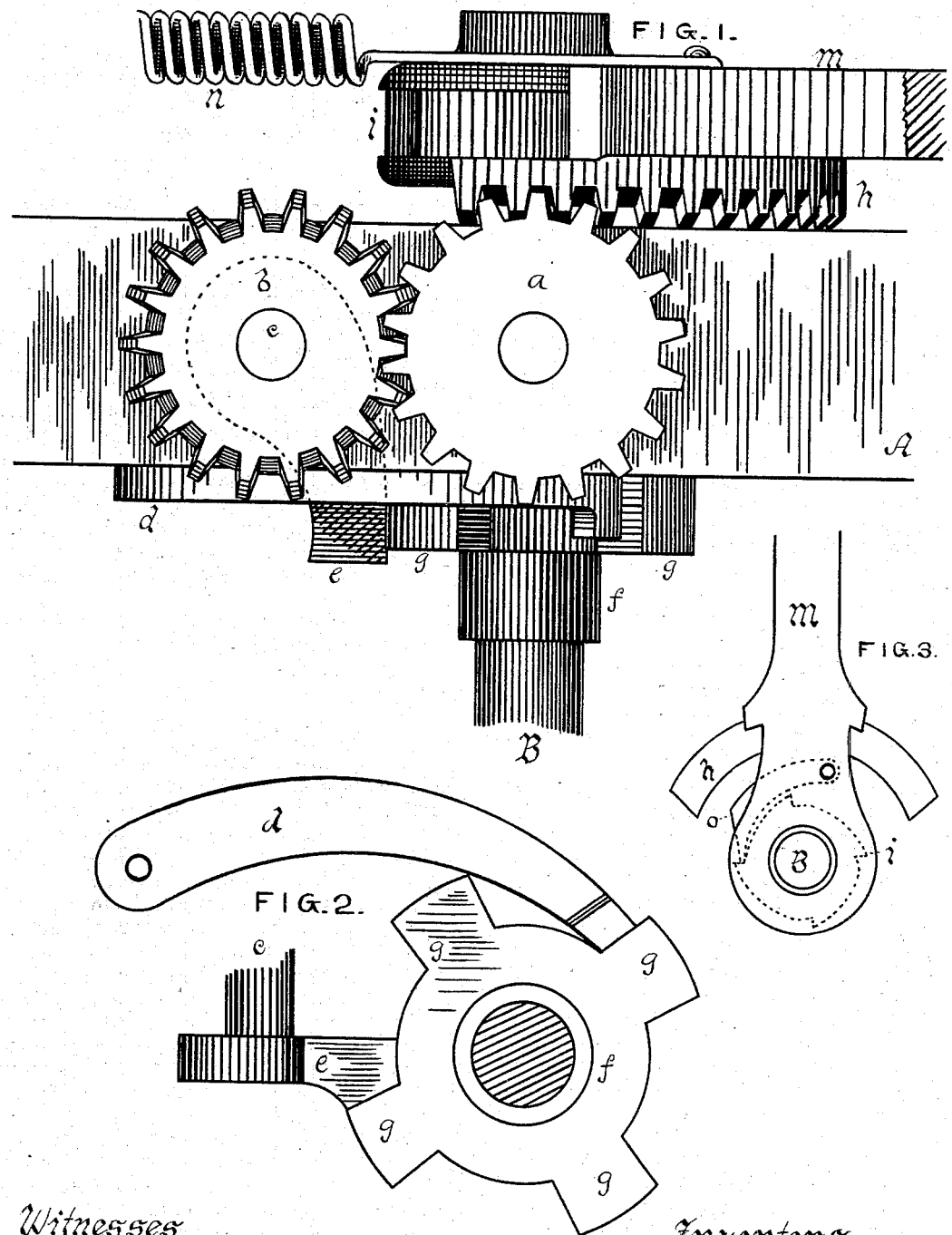

UNITED STATES PATENT OFFICE.

FRED LITTERER AND LEWIS McKINNISS, OF DECATUR, ILLINOIS.

CHECK-ROWER FOR CORN-PLANTERS.

SPECIFICATION forming part of Letters Patent No. 278,441, dated May 29, 1883.

Application filed July 21, 1882. (No model.)

*To all whom it may concern:*

Be it known that we, FRED LITTERER and LEWIS McKINNISS, residents of the city of Decatur, county of Macon, and State of Illinois, have invented certain new and useful Improvements in Check-Rowers for Corn-Planters, of which the following is a specification.

The class of check-rowers to which our invention relates is distinguished by the following peculiarities: The drop is effected by means of stops or knots on a check-row wire. The stops on the wire operate oscillating levers that, when thrown in one direction by said stops, are made to return to their original position automatically by means of springs, weights, or other similar devices. The oscillating motion of the levers is converted into intermittent rotary motion in a shaft that extends the entire length of the check-row bar, and this intermittent motion is applied to the seed-slides of the corn-planter through a series of gear-wheels or other suitable device.

The check-rowers to which our invention relates are further known as "side draft," inasmuch as the check-row bar extends across the planter, and is provided with a device at each end, through which the seed-slides are operated, and the check-row wire works on each end of the bar alternately as the planter moves back and forth across the field.

The object of our invention is to convert the oscillating motion of the bifurcated arms through which the check-row wire passes into intermittent rotary motion in the shaft that operates the seed-slides of the planter in such a manner that when a stroke of the lever is effected the shaft shall be absolutely locked.

Our invention consists in providing the oscillating lever with a segment of gear-wheel that, through a series of pinions, operates a locking-pawl which engages a ratchet on the shaft and locks the same; also, in details to be hereinafter shown by reference to the accompanying drawings, in which—

Figure 1 is a plan of our device, showing a lock effected. Fig. 2 is an end view of the ratchet and pawls used to effect the lock. Fig. 3 is an elevation of the oscillating lever as seen from the end of the check-row bar, showing the ratchet and pawl that are used to operate the shaft.

$a$ is a detachable gear-wheel located directly over the shaft.

$b$ is a gear-wheel attached to shaft $c$, which extends through bar A, and to which lock-pawl $e$ is rigidly attached.

A is one of the cross arms that, attached to each end of the check-row bar, carry operating devices, as herein shown, and suitable pulleys for receiving and discharging the wire.

B is a shaft that extends across the planter parallel with the check-row bar, and which is connected with the seed-slides of the corn-planter by means of gear-wheels or other suitable devices.

$f$ is a lock-ratchet rigidly attached to shaft B, and provided with teeth $g\,g\,g\,g$.

$h$ is a segment of cog-wheel on oscillating lever $m$.

$i$ is a ratchet rigid on shaft B, and $o$ is a pawl in lever $m$.

$n$ is the spring that carries lever $m$ to its original position after a stroke has been effected. Lever $m$ is extended into a bifurcated arm, through which the check-row wire passes.

The drawings show a lock effected. When the spring draws the lever back the segment $h$ operates lock-pawl $e$ through pinions $a\,b$ and shaft $c$, thereby releasing ratchet $f$ and permitting the shaft to revolve with the next stroke. Ratchet $i$ is rigid on shaft B, and pawl $o$ has its bearing in lever $m$, which works loosely on said shaft. As lever $m$ is thrown by the check-row wire, pawl $o$ engages a tooth in ratchet $i$ and carries shaft B a one-fourth revolution, and, as indicated in the drawings, pawl $d$ drops behind a tooth, $g$, and prevents any back motion in the shaft, while the lever $m$ swings back by means of spring $n$ to its original position. Pawl $d$ is a back-motion lock, and pawl $e$ is a forward-motion lock.

The devices herein shown are made in pairs and located one at each end of the check-row bar. When by any cause pawl $e$ does not come in close contact with the ratchet-lock $f$ when a stroke is made, the defect is remedied by raising wheel $a$ from its bearing and moving the pawl toward the lock a suitable distance. Then when wheel $a$ is replaced and secured the operation will be found correct.

We claim—

1. The combination of lever $m$, cog-bar $h$, wheels $a\,b$, pin $c$, and pawl $e$ with ratchet $f$ on shaft B, substantially as shown and described.

2. The combination, with pawl e, cog-bar h, and wheel b, of detachable wheel a, as and for the purpose set forth.

3. The combination, in a lock for check-row shafts, of lever m, segmental cog-bar h, and wheel a, as and for the purpose set forth.

4. The combination, with lever m, segmental cog-bar h, wheels a b, pin c, and pawl e, of ratchet f and pawl d, as and for the purpose set forth.

FRED LITTERER.
LEWIS McKINNISS.

Attest:
I. S. KAUFMAN,
C. F. KNOWLES.